(12) United States Patent
Matsumasa

(10) Patent No.: US 11,539,082 B2
(45) Date of Patent: *Dec. 27, 2022

(54) SECONDARY BATTERY

(71) Applicant: SANYO Electric Co., Ltd., Daito (JP)

(72) Inventor: Yoshitaka Matsumasa, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 416 days.

This patent is subject to a terminal disclaimer.

(21) Appl. No.: 16/701,828

(22) Filed: Dec. 3, 2019

(65) Prior Publication Data

US 2020/0212501 A1 Jul. 2, 2020

(30) Foreign Application Priority Data

Dec. 27, 2018 (JP) .............................. JP2018-245220

(51) Int. Cl.
*H01M 10/0587* (2010.01)
*H01M 4/134* (2010.01)
*H01M 4/66* (2006.01)
*H01M 4/02* (2006.01)

(52) U.S. Cl.
CPC ....... *H01M 10/0587* (2013.01); *H01M 4/134* (2013.01); *H01M 4/662* (2013.01); *H01M 2004/021* (2013.01); *H01M 2004/027* (2013.01); *H01M 2004/028* (2013.01)

(58) Field of Classification Search
CPC .. H01M 10/0587; H01M 4/134; H01M 4/662; H01M 2004/021; H01M 2004/027; H01M 2004/028; H01M 50/538; H01M 10/0431; H01M 4/04; Y02E 60/10; Y02P 70/50
See application file for complete search history.

(56) References Cited

FOREIGN PATENT DOCUMENTS

JP 2010-282846 A 12/2010

*Primary Examiner* — Cynthia K Walls
(74) *Attorney, Agent, or Firm* — WHDA, LLP

(57) ABSTRACT

A negative-electrode core laminate of a portion of a negative-electrode core on which no negative-electrode active material layer is formed is bonded to a negative-electrode current collector by ultrasonic bonding. A core recess is formed in a bonding region of the negative-electrode core laminate bonded to the negative-electrode current collector by ultrasonic bonding, a region of the negative-electrode core laminate in which the core recess is formed includes a solid-state bonding layer and a central layer, the solid-state bonding layer being formed by solid-state bonding between layers of the negative-electrode core, the central layer being disposed between the solid-state bonding layers formed on both faces of the negative-electrode core. The average grain size of metal crystal grains constituting the solid-state bonding layer is smaller than the average grain size of metal crystal grains constituting the central layer.

7 Claims, 13 Drawing Sheets

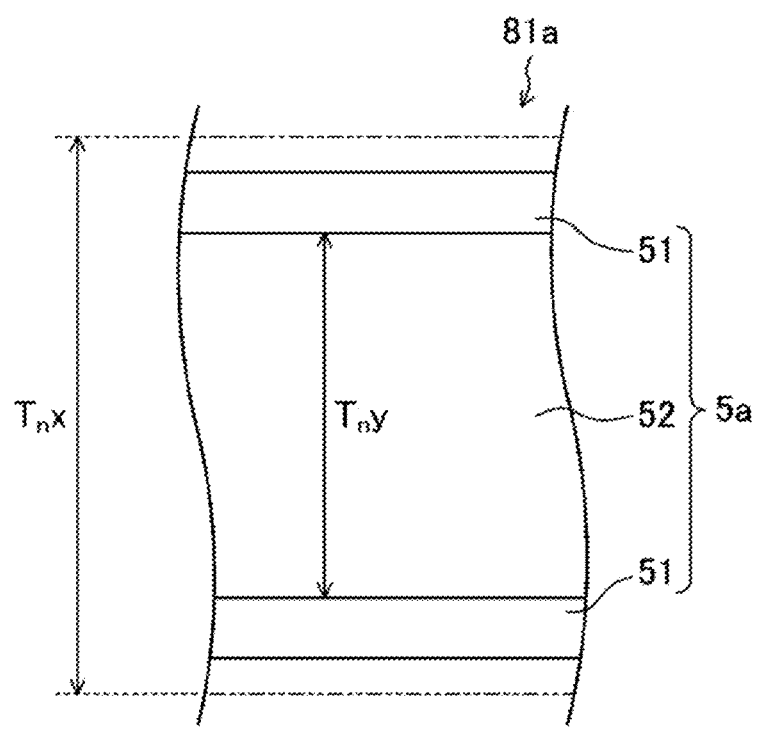

CRACKING MAY OCCUR

SECONDARY BATTERY

CROSS REFERENCE TO RELATED APPLICATIONS

The present invention application claims priority to Japanese Patent Application No. 2018-245220 filed in the Japan Patent Office on Dec. 27, 2018, the entire contents of which are incorporated herein by reference.

BACKGROUND OF THE INVENTION

Field of the Invention

The present invention relates to a secondary battery.

Description of Related Art

Non-aqueous electrolyte secondary batteries, such as alkaline secondary batteries and lithium-ion batteries, are used as power supplies mounted on electric vehicles and hybrid electric vehicles. A known secondary battery includes a flat wound electrode assembly and an electrolyte in an exterior, wherein a long positive-electrode sheet and a long negative-electrode sheet with a separator interposed therebetween are wound to form the wound electrode assembly. Such a battery including a wound electrode assembly includes a positive-electrode core laminate at one end of the wound electrode assembly and a negative-electrode core laminate at the other end of the wound electrode assembly to couple the wound electrode assembly to a current collector. The positive-electrode core laminate is composed of layers of a positive-electrode core on which no positive-electrode active material layer is formed, and the negative-electrode core laminate is composed of layers of a negative-electrode core on which no negative-electrode active material layer is formed.

The positive-electrode core laminate and the negative-electrode core laminate are bonded to a positive-electrode current collector and a negative-electrode current collector, respectively, by a welding technique.

Japanese Published Unexamined Patent Application No. 2010-282846 (Patent Document 1) discloses that when a negative-electrode core laminate is bonded to a negative-electrode current collector by ultrasonic bonding, to improve the bonding strength between a wound electrode assembly and the current collector (current collector terminal), the number of welding recesses on the front side of the negative-electrode core laminate is decreased compared with that on the negative-electrode current collector side, and the welding recess is deepened compared with that on the negative-electrode current collector side.

When a copper or copper alloy core laminate is bonded to a copper or copper alloy current collector by ultrasonic bonding according to a method described in Patent Document 1, however, a crack is often formed between a bonding region of the core laminate in which welding recesses are formed and a non-bonding region surrounding the bonding region.

BRIEF SUMMARY OF THE INVENTION

Accordingly, one aspect of the present disclosure aims to decrease cracks in a core laminate in a secondary battery including a copper or copper alloy core laminate bonded to a copper or copper alloy current collector by ultrasonic bonding.

A secondary battery according to one aspect of the present disclosure includes an electrode assembly including a first electrode sheet and a second electrode sheet, the first electrode sheet and the second electrode sheet having different polarities, and a first electrode current collector electrically connected to the first electrode sheet, wherein the first electrode sheet includes a first electrode core and a first electrode active material layer on the first electrode core, the first electrode core is made of copper or a copper alloy, the first electrode current collector is made of copper or a copper alloy, the electrode assembly includes a first electrode core laminate of the first electrode core, the first electrode core laminate is bonded to the first electrode current collector by ultrasonic bonding, a core recess is formed in a bonding region of the first electrode core laminate bonded to the first electrode current collector by ultrasonic bonding, a region of the first electrode core laminate in which the core recess is formed includes a solid-state bonding layer and a central layer, the solid-state bonding layer being formed by solid-state bonding of an interface between layers of the first electrode core, the central layer being disposed between the solid-state bonding layers formed on both faces of the first electrode core, and metal crystal grains constituting the solid-state bonding layer have a first average grain size smaller than a second average grain size of metal crystal grains constituting the central layer.

One aspect of the present disclosure can decrease cracks in a core laminate in a secondary battery including a copper or copper alloy core laminate bonded to a copper or a copper alloy current collector by ultrasonic bonding.

BRIEF DESCRIPTION OF THE SEVERAL VIEWS OF THE DRAWINGS

FIG. 7 shows a solid-state bonding layer and a central layer in a bonding region of a negative-electrode core laminate in a secondary battery according to an embodiment;

DETAILED DESCRIPTION OF THE INVENTION

The present inventors have found the following when a copper or copper alloy negative-electrode core laminate is bonded to a copper or copper alloy negative-electrode current collector by ultrasonic bonding described in Patent Document 1.

Ultrasonic bonding between the copper or copper alloy negative-electrode core laminate and the copper or copper alloy negative-electrode current collector by a method described in Patent Document 1 transformed copper crystal grains into fine crystal grains in the entire bonding region of the negative-electrode core laminate in which a welding recess is formed. However, large copper crystal grain sizes before the ultrasonic bonding were maintained in a non-bonding region outside the bonding region of the negative-electrode core laminate. Thus, it was found that in the negative-electrode core laminate bonded to the negative-electrode current collector by ultrasonic bonding, the state of crystal grains (hereinafter referred to as the crystal grain state), such as grain sizes, in the bonding region was significantly different from the crystal grain state of the non-bonding region, and consequently this increased the risk of cracking due to a lattice defect between the bonding region and the non-bonding region.

Hence, the present inventors arrived at the present invention in which the ultrasonic bonding conditions are controlled to form a solid-state bonding layer containing finer crystal grains near a bonding surface formed by solid-state bonding between surfaces of a negative-electrode core in a bonding region of a negative-electrode core laminate in which a welding recess is formed and to form a central layer within each negative-electrode core (a central portion between solid-state bonding layers formed on both surfaces of each negative-electrode core), transformation of crystal grains in the central layer being suppressed. Thus, in the bonding region of the negative-electrode core laminate bonded to a negative-electrode current collector by ultrasonic bonding, solid-state bonding between layers of a negative-electrode core ensures bonding strength and decreases bonding resistance, and the central layer within each negative-electrode core in which transformation of crystal grains is suppressed ensures the continuity of the crystal grain state between the bonding region and the non-bonding region and can reduce the occurrence of cracking due to a lattice defect between the regions.

A secondary battery according to an embodiment of the present invention is described below with reference to the accompanying drawings. The scope of the present invention is not limited to the following embodiments and can be changed within the scope of the technical idea of the present invention.

First, a rectangular secondary battery according to an embodiment is described below.

Figure 1:
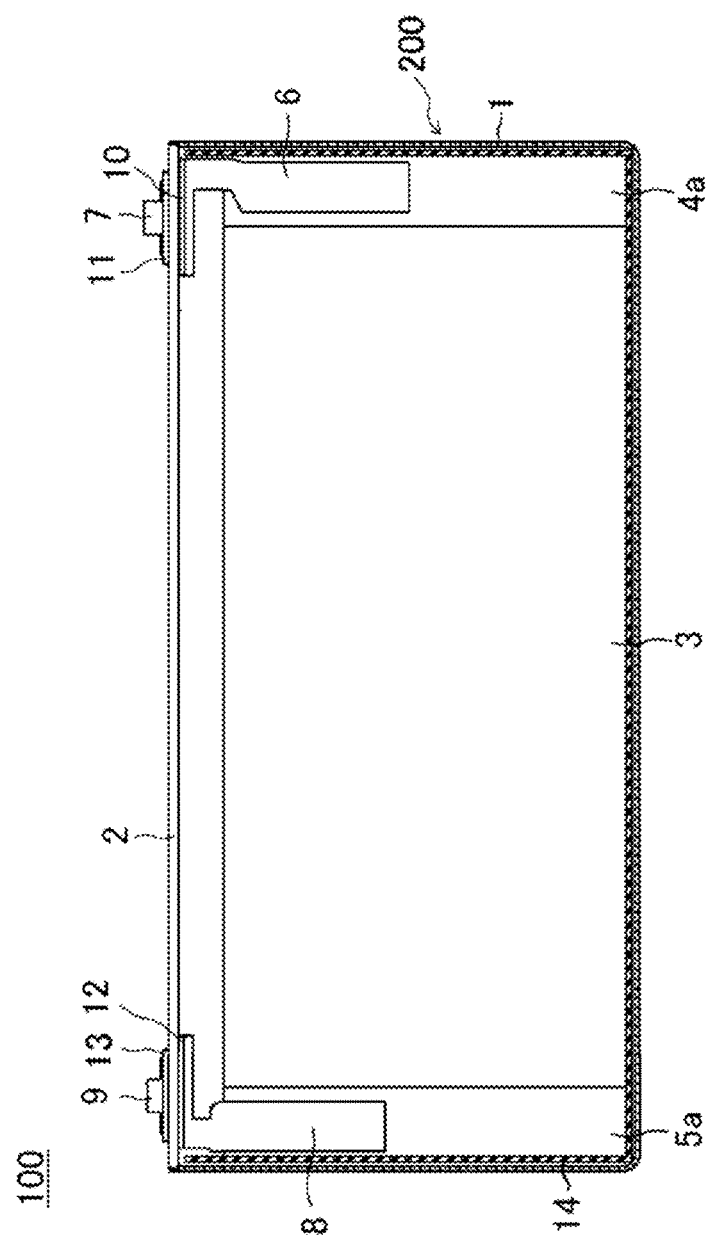
FIG. 1 is a front view of the interior of a secondary battery according to an embodiment except the front of a battery case and the front of an insulating sheet.
Figure 2:
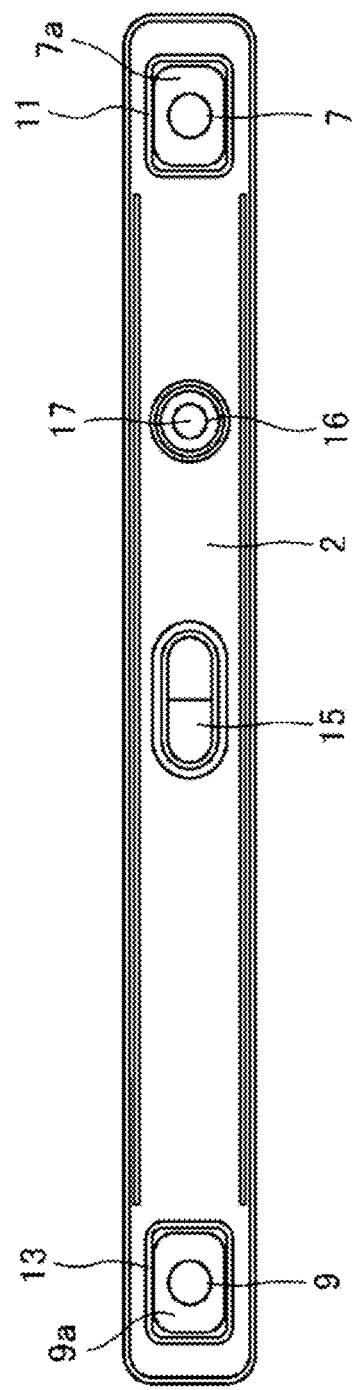
FIG. 2 is a top view of a secondary battery according to an embodiment.

FIG. 1 is a front view of the interior of a rectangular secondary battery 100 according to the present embodiment except the front of a battery case and the front of an insulating sheet. FIG. 2 is a top view of the rectangular secondary battery 100.

As illustrated in FIGS. 1 and 2, the rectangular secondary battery 100 includes a rectangular exterior 1 with an upward opening and a sealing plate 2 for sealing the opening. The rectangular exterior 1 and the sealing plate 2 constitute a battery case 200. The rectangular exterior 1 and the sealing plate 2 are made of a metal, for example, aluminum or an aluminum alloy. The rectangular exterior 1 contains a flat wound electrode assembly 3 and a non-aqueous electrolyte (not shown). The flat wound electrode assembly 3 is formed by winding a long positive-electrode sheet (not shown) and a long negative-electrode sheet (not shown) with a long separator (not shown) interposed therebetween. The positive-electrode sheet includes a positive-electrode active material layer containing a positive-electrode active material formed on a metallic positive-electrode core and includes a positive-electrode core exposing portion through which the positive-electrode core is exposed in the longitudinal direction. The negative-electrode sheet includes a negative-electrode active material layer containing a negative-electrode active material formed on a metallic negative-electrode core and includes a negative-electrode core exposing portion through which the negative-electrode core is exposed in the longitudinal direction. The positive-electrode core is made of aluminum or an aluminum alloy, for example. The negative-electrode core is made of copper or a copper alloy, for example.

A portion of the positive-electrode core 4a on which no positive-electrode active material layer is formed (a positive-electrode core exposing portion) is layered at one end of the wound electrode assembly 3 in the winding axis direction. The positive-electrode core 4*a* is wound without a separator or a negative-electrode sheet and is layered. The layered positive-electrode core 4*a* (hereinafter also referred to as a positive-electrode core laminate) is coupled to a positive-electrode current collector 6. The positive-electrode current collector 6 is made of aluminum or an aluminum alloy, for example.

A portion of the negative-electrode core 5*a* on which no negative-electrode active material layer is formed (a negative-electrode core exposing portion) is layered at the other end of the wound electrode assembly 3 in the winding axis direction. The negative-electrode core 5*a* is wound without a separator or a positive-electrode sheet and is layered. The layered negative-electrode core 5*a* (hereinafter also referred to as a negative-electrode core laminate) is coupled to a negative-electrode current collector 8. The negative-electrode current collector 8 is made of copper or a copper alloy, for example.

A positive-electrode terminal 7 has a rim 7*a* on the outer surface of the sealing plate 2 and an insert for a through-hole in the sealing plate 2. The positive-electrode terminal 7 is made of a metal, for example, aluminum or an aluminum alloy. A negative-electrode terminal 9 has a rim 9*a* on the outer surface of the sealing plate 2 and an insert for a through-hole in the sealing plate 2. The negative-electrode terminal 9 is made of a metal, for example, copper or a copper alloy. The negative-electrode terminal 9 may have an aluminum or aluminum alloy portion and a copper or copper alloy portion. In this case, the aluminum or aluminum alloy portion may protrude from the sealing plate 2, and the copper or copper alloy portion may be coupled to the negative-electrode current collector 8.

The positive-electrode current collector 6 is fixed to the sealing plate 2 with an inner insulating member 10 made of a resin interposed therebetween, and the positive-electrode terminal 7 is fixed to the sealing plate 2 with an outer insulating member 11 made of a resin interposed therebetween. Thus, the inner insulating member 10 is disposed between the sealing plate 2 and the positive-electrode current collector 6, and the outer insulating member 11 is disposed between the sealing plate 2 and the positive-electrode terminal 7. The negative-electrode current collector 8 is fixed to the sealing plate 2 with an inner insulating member 12 made of a resin interposed therebetween, and the negative-electrode terminal 9 is fixed to the sealing plate 2 with an outer insulating member 13 made of a resin interposed therebetween. Thus, the inner insulating member 12 is disposed between the sealing plate 2 and the negative-electrode current collector 8, and the outer insulating member 13 is disposed between the sealing plate 2 and the negative-electrode terminal 9.

The wound electrode assembly 3 is covered with an insulating sheet 14 and is placed in the rectangular exterior 1. The sealing plate 2 is welded to an opening edge of the rectangular exterior 1 by laser welding. The sealing plate 2 has an electrolyte solution inlet 16, which is sealed with a sealing plug 17 after an electrolyte solution is poured into the rectangular exterior 1. The sealing plate 2 has a gas release valve 15 for releasing gas if the internal pressure of the battery exceeds a predetermined value.

<Production of Electrode Assembly>

A method for producing the wound electrode assembly 3 is described below.

Figure 3A:
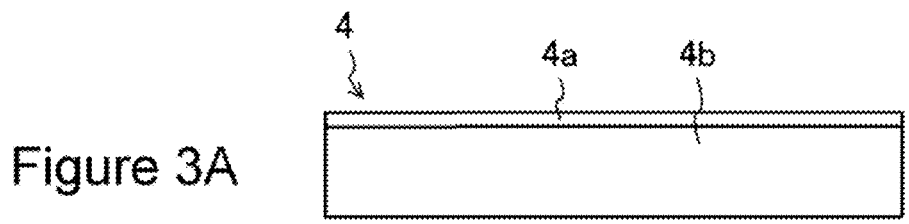
FIG. 3A is a plan view of a positive-electrode sheet according to an embodiment.

FIG. 3A is a plan view of a positive-electrode sheet 4 according to the present embodiment. As illustrated in FIG. 3A, the positive-electrode sheet 4 includes a positive-electrode active material layer 4*b* containing a positive-electrode active material on a positive-electrode core 4*a*, for example, made of aluminum and has a positive-electrode core exposing portion with a predetermined width at an end thereof in the short side direction. The positive-electrode active material layer 4*b* is not formed on the positive-electrode core exposing portion.

The positive-electrode sheet 4 illustrated in FIG. 3A is produced by the following method. First, a positive-electrode mixture slurry containing a positive-electrode active material, for example, lithium nickel cobalt manganese composite oxide, an electrically conductive agent, a binder, and a dispersion medium is prepared. The positive-electrode mixture slurry is then applied to both faces of the positive-electrode core 4*a*, for example, made of belt-like aluminum foil 15 µm in thickness. The positive-electrode mixture slurry is then dried to remove the dispersion medium. Thus, the positive-electrode active material layer 4*b* is formed on both faces of the positive-electrode core 4*a*. The positive-electrode active material layer 4*b* is then pressed to a predetermined packing density to complete the positive-electrode sheet 4.

Figure 3B:
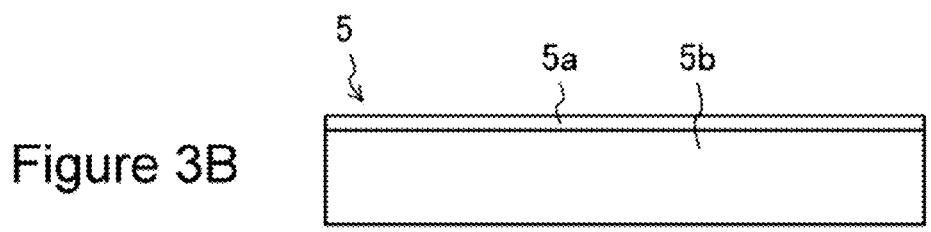
FIG. 3B is a plan view of a negative-electrode sheet according to an embodiment.

FIG. 3B is a plan view of a negative-electrode sheet 5 according to the present embodiment. As illustrated in FIG. 3B, the negative-electrode sheet 5 includes a negative-electrode active material layer 5*b* containing a negative-electrode active material on a negative-electrode core 5*a*, for example, made of copper and has a negative-electrode core exposing portion with a predetermined width at an end thereof in the short side direction. The negative-electrode active material layer 5*b* is not formed on the negative-electrode core exposing portion.

The negative-electrode sheet 5 illustrated in FIG. 3B is produced by the following method. First, a negative-electrode mixture slurry containing a negative-electrode active material, for example, a graphite powder, a binder, and a dispersion medium is prepared. The negative-electrode mixture slurry is then applied to both faces of the negative-electrode core 5*a*, for example, made of belt-like copper foil 8 µm in thickness. The negative-electrode mixture slurry is then dried to remove the dispersion medium. Thus, the negative-electrode active material layer 5*b* is formed on both faces of the negative-electrode core 5*a*. The negative-electrode active material layer 5*b* is then pressed to a predetermined packing density to complete the negative-electrode sheet 5.

The positive-electrode sheet 4 and the negative-electrode sheet 5 produced by these methods are placed such that the positive-electrode core exposing portion and the negative-electrode core exposing portion do not overlap the active material layer of the facing electrode, are wound with a porous separator, for example, made of polyethylene interposed therebetween, and are flattened. Thus, the wound electrode assembly 3 is produced that includes a positive-electrode core laminate of the positive-electrode core 4*a* (positive-electrode core exposing portion) at one end and a negative-electrode core laminate of the negative-electrode core 5*a* (negative-electrode core exposing portion) at the other end.

<Attachment of Component to Sealing Plate>

The positive-electrode current collector 6, the positive-electrode terminal 7, the negative-electrode current collector 8, and the negative-electrode terminal 9 are attached to the sealing plate 2 by the following method.

First, on the positive electrode side, the outer insulating member 11 is placed on the outer surface of the sealing plate 2, and the inner insulating member 10 and the positive-electrode current collector 6 are placed on the inner surface of the sealing plate 2. An insert of the positive-electrode terminal 7 is put into a through-hole in the outer insulating member 11, the sealing plate 2, the inner insulating member 10, and the positive-electrode current collector 6 from the outside, and the tip of the insert of the positive-electrode terminal 7 is bent on the positive-electrode current collector 6. Thus, the positive-electrode terminal 7, the outer insulating member 11, the sealing plate 2, the inner insulating member 10, and the positive-electrode current collector 6 are integrally fixed. The tip of the insert of the positive-electrode terminal 7 thus bent may be welded to the positive-electrode current collector 6.

Likewise, on the negative electrode side, the outer insulating member 13 is placed on the outer surface of the sealing plate 2, and the inner insulating member 12 and the negative-electrode current collector 8 are placed on the inner surface of the sealing plate 2. An insert of the negative-electrode terminal 9 is put into a through-hole in the outer insulating member 13, the sealing plate 2, the inner insulating member 12, and the negative-electrode current collector 8 from the outside, and the tip of the insert of the negative-electrode terminal 9 is bent on the negative-electrode current collector 8. Thus, the negative-electrode terminal 9, the outer insulating member 13, the sealing plate 2, the inner insulating member 12, and the negative-electrode current collector 8 are integrally fixed. The tip of the insert of the negative-electrode terminal 9 thus bent may be welded to the negative-electrode current collector 8.

<Attachment of Current Collector to Electrode Assembly>

A method for attaching the negative-electrode current collector 8 to the negative-electrode core laminate of the wound electrode assembly 3 is described below.

The negative-electrode current collector 8 made of copper 0.8 mm in thickness is placed on the outer surface of the negative-electrode core laminate, for example, composed of 62 layers of the negative-electrode core 5a, for example, made of copper 8 μm in thickness. The negative-electrode current collector 8 and the negative-electrode core laminate are placed between a horn 90 and an anvil 91 of an ultrasonic bonding apparatus illustrated in FIG. 4, for example. The horn 90 is in contact with the outer surface of the layers of the negative-electrode core 5a, and the anvil 91 is in contact with a surface of the negative-electrode current collector 8 opposite the surface of the negative-electrode current collector 8 in contact with the negative-electrode core 5a.

The horn 90 is then vibrated for bonding between the layers of the negative-electrode core 5a and for bonding between the negative-electrode core 5a and the negative-electrode current collector 8. The ultrasonic bonding conditions may include, but are not limited to, a horn load in the range of 1000 to 2500 N (100 to 250 kgf), a frequency in the range of 19 to 30 kHz, and a bonding time in the range of 300 to 800 ms. At a frequency of 20 kHz, the horn amplitude may range from 60% to 95% of the maximum amplitude (for example, 50 μm).

Ultrasonic vibration applied to the layered negative-electrode core 5a and the negative-electrode current collector 8 removes an oxide film from the surfaces of the negative-electrode core 5a and the negative-electrode current collector 8 by friction and enables solid-state bonding between the layers of the negative-electrode core 5a and between the negative-electrode core 5a and the negative-electrode current collector 8, thus resulting in strong bonding between the layered negative-electrode core 5a, that is, the negative-electrode core laminate and the negative-electrode current collector 8.

Figure 4:
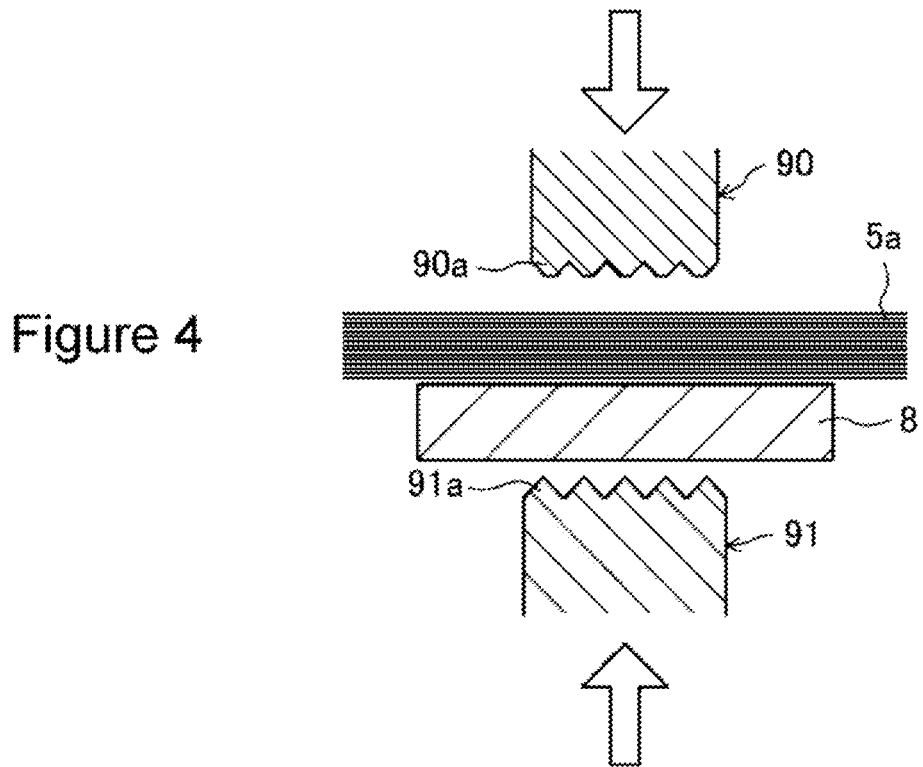
FIG. 4 shows a negative-electrode core laminate and a negative-electrode current collector between a horn and an anvil during ultrasonic bonding in the production of a secondary battery according to an embodiment.

As illustrated in FIG. 4, a surface of the horn 90 to come into contact with the negative-electrode core 5a has a plurality of horn protrusions 90a, and ultrasonic bonding is performed while the horn protrusions 90a are engaged in the layered negative-electrode core 5a.

As illustrated in FIG. 4, a surface of the anvil 91 to come into contact with the negative-electrode current collector 8 has a plurality of anvil protrusions 91a, and ultrasonic bonding is performed while the anvil protrusions 91a are engaged in the negative-electrode current collector 8.

Figure 5A:
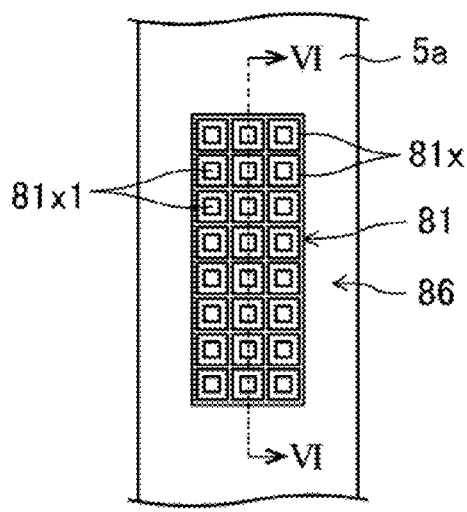
FIG. 5A shows the front side of a negative-electrode core laminate bonded to a negative-electrode current collector in a secondary battery according to an embodiment.
Figure 5B:
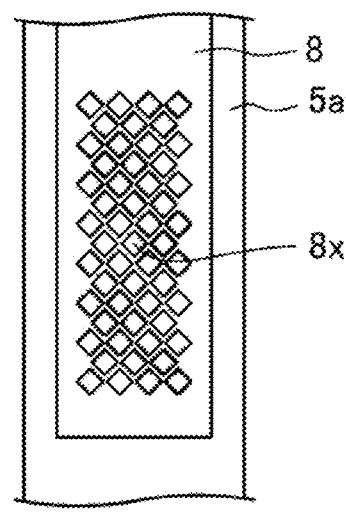
FIG. 5B shows the front side of the negative-electrode current collector.

FIGS. 5A and 5B show the layered negative-electrode core 5a (negative-electrode core laminate) on the negative-electrode current collector 8. FIG. 5A shows the front side of the negative-electrode core laminate, and FIG. 5B shows the front side of the negative-electrode current collector 8.

As illustrated in FIG. 5A, the layered negative-electrode core 5a is bonded to the negative-electrode current collector 8 by ultrasonic bonding, and the layered negative-electrode core 5a has a bonding region 81 bonded to the negative-electrode current collector 8. The bonding region 81 has recessed and raised portions. More specifically, the bonding region 81 has core recesses 81x corresponding to the horn protrusions 90a. Each of the core recesses 81x may have a flat portion 81x1 at its bottom. The boundary between adjacent core recesses 81x may be raised.

The flat portion 81x1 at the bottom of each core recess 81x promotes friction behavior in the bonding region 81 during ultrasonic bonding and forms a strong bond between the layers of the negative-electrode core 5a and between the negative-electrode core 5a and the negative-electrode current collector 8. The flat portion 81x1 may have an area in the range of 0.01 to 0.16 mm$^2$.

As illustrated in FIG. 5B, a surface of the negative-electrode current collector 8 in the region bonded to the layered negative-electrode core 5a opposite the layered negative-electrode core 5a has current collector recesses 8x corresponding to the anvil protrusions 91a. No flat portion may be formed at the bottom of each current collector recess 8x, or a flat portion smaller than the flat portion 81x1 may be formed at the bottom of each current collector recess 8x.

Any number of core recesses 81x may be formed in the bonding region 81, and any number of current collector recesses 8x may be formed in the negative-electrode current collector 8. For example, the number of current collector recesses 8x may be larger than the number of core recesses 81x.

Figure 6:
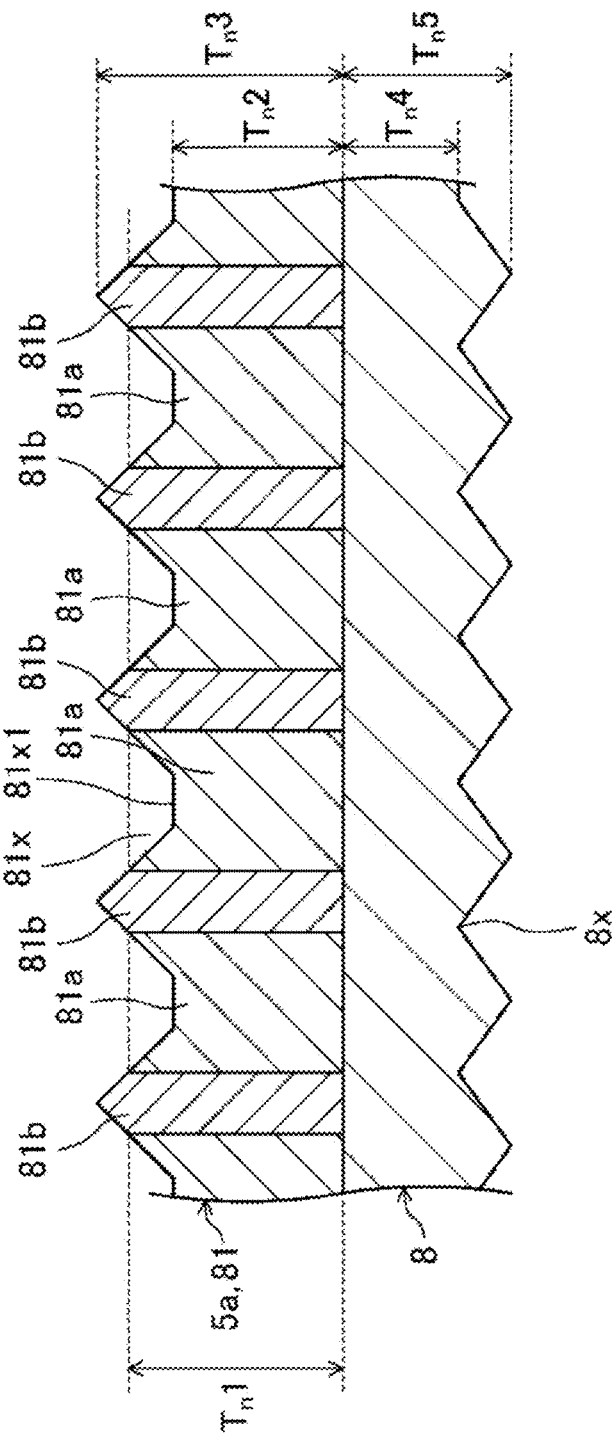
FIG. 6 is a cross-sectional view taken along the line VI-VI of FIG. 5A.

FIG. 6 is a cross-sectional view taken along the line VI-VI of FIG. 5A.

As illustrated in FIG. 6, the bonding region 81 of the layered negative-electrode core 5a (negative-electrode core laminate) includes a first region 81a with a thickness smaller than $T_n1$ and a second region 81b with a thickness larger than $T_n1$, wherein $T_n1$ denotes the product of the thickness of a layer of the negative-electrode core 5a in a region not bonded to the negative-electrode current collector 8 (a non-bonding region 86 in FIG. 5A) and the number of layers of the negative-electrode core 5a in the bonding region 81. The bonding region 81 with such a structure in the negative-electrode core laminate can prevent the negative-electrode core 5a from being damaged or broken and form a strong bond between the negative-electrode core 5a and the negative-electrode current collector 8, as described later. In particular, the bonding strength (peel strength) between the layers of the negative-electrode core 5a in the first region 81a higher than the bonding strength (peel strength) between the layers of the negative-electrode core 5a in the second region 81b can result in a strong bond between the layered negative-electrode core 5a and the negative-electrode current collector 8 and more effectively prevent the negative-electrode core 5a from being damaged or broken.

The smallest thickness $T_n2$ in the first region 81a and the largest thickness $T_n3$ in the second region 81b are controlled via the horn load, frequency, horn amplitude, bonding time, or the like of the ultrasonic bonding apparatus such that the bonding region 81 of the negative-electrode core laminate can have appropriate bonding strength, conductivity, and appearance. In particular, the thickness $T_n2$ and the thickness $T_n3$ can be controlled via the horn amplitude.

For the negative-electrode core 5a made of copper, for example, $T_n2/T_n1$ may range from 0.70 to 0.95, and $T_n3/T_n1$ may range from 1.10 to 1.98, preferably 1.27 to 1.42. This can more reliably prevent the negative-electrode core 5a from being damaged or broken and can form a stronger bond between the negative-electrode core 5a and the negative-electrode current collector 8. The difference between the thickness $T_n3$ and the thickness $T_n2$ ($T_n3-T_n2$) may range from 0.2 to 0.4 mm.

Ultrasonic bonding may be performed such that the layer of the negative-electrode core 5a in the first region 81a farthest from the negative-electrode current collector 8 has an elongation percentage X of 20% or less by the ultrasonic bonding. This can more reliably prevent the negative-electrode core 5a from being damaged or broken. The "elongation percentage" is calculated by (the length of the negative-electrode core 5a after ultrasonic bonding—the length of the negative-electrode core 5a before ultrasonic bonding)/(the length of the negative-electrode core 5a before ultrasonic bonding)×100.

Ultrasonic bonding may be performed such that the layer of the negative-electrode core 5a in the second region 81b farthest from the negative-electrode current collector 8 has an elongation percentage Y smaller than the elongation percentage X by the ultrasonic bonding. This can more reliably prevent the negative-electrode core 5a from being damaged or broken. For example, ultrasonic bonding may be performed such that the layer of the negative-electrode core 5a in the second region 81b farthest from the negative-electrode current collector 8 has an elongation percentage Y of 5% or less by the ultrasonic bonding.

The thickness $T_n2$ (the smallest thickness in the first region 81a) may be larger than the smallest thickness $T_n4$ of the portion of the negative-electrode current collector 8 bonded to the negative-electrode core 5a. The difference between the largest thickness $T_n5$ and the smallest thickness $T_n4$ ($T_n5-T_n4$) of the portion of the negative-electrode current collector 8 bonded to the negative-electrode core 5a may be larger than the difference between the thickness $T_n1$ (the product of the thickness of a layer of the negative-electrode core 5a in the non-bonding region 86 and the number of layers of the negative-electrode core 5a in the bonding region 81) and the thickness $T_n2$ ($T_n1-T_n2$).

In the first region 81a, the layers of the negative-electrode core 5a are bonded together by solid-state bonding. More specifically, as illustrated in FIG. 7, in the first region 81a, layers of the negative-electrode core 5a bonded together by solid-state bonding form a solid-state bonding layer 51, and a central layer 52 is disposed in a central portion of a layer of the negative-electrode core 5a in the thickness direction (a portion between the solid-state bonding layers 51 formed on both faces of the negative-electrode core 5a). In the central layer 52, transformation of crystal grains is suppressed during ultrasonic bonding. The average grain size of copper crystal grains constituting the solid-state bonding layer 51 is smaller than the average grain size of copper crystal grains constituting the central layer 52. More specifically, copper crystal grains constituting the solid-state bonding layer 51 have an aspect ratio (short diameter:long diameter) in the range of 1:1 to 1:2 and an average grain size (long diameter) in the range of 0.1 to 1.5 µm, and copper crystal grains constituting the central layer 52 have an aspect ratio (short diameter:long diameter) in the range of 1:1 to 1:4 and an average grain size (long diameter) in the range of 2 to 5 µm. Thus, the average grain size (long diameter) of copper crystal grains constituting the solid-state bonding layer 51 may be 75% or less, more specifically in the range of approximately 2% to 75%, of the average grain size (long diameter) of copper crystal grains constituting the central layer 52.

The average grain size of copper crystal grains constituting the central layer 52 is smaller than the average grain size of copper crystal grains constituting the non-bonding region 86 of the negative-electrode core laminate (see FIG. 5A). More specifically, copper crystal grains constituting the central layer 52 have an aspect ratio (short diameter:long diameter) in the range of 1:1 to 1:4 and an average grain size (long diameter) in the range of 2 to 5 as described above, and copper crystal grains constituting the non-bonding region 86 have an aspect ratio (short diameter:long diameter) in the range of 1:1 to 1:4 and an average grain size (long diameter) in the range of 2.5 to 6 The average grain size (long diameter) of copper crystal grains constituting the central layer 52 is approximately 85% or less of the average grain size (long diameter) of copper crystal grains constituting the non-bonding region 86. The average grain size (long diameter) of copper crystal grains constituting the central layer 52 preferably ranges from 70% to 95%, more preferably 75% to 90%, of the average grain size (long diameter) of copper crystal grains constituting the non-bonding region 86. This can ensure the continuity of the crystal grain state between the bonding region 81 and the non-bonding region 86.

The central layer 52 in the first region 81a can effectively prevent the smallest thickness $T_n2$ in the first region 81a from becoming excessively small and can effectively prevent the negative-electrode core 5a from being damaged or broken. As illustrated in FIG. 7, when the thickness $T_ny$ of the central layer 52 of the negative-electrode core 5a in the first region 81a (the portion between the solid-state bonding layer 51 on one face of the negative-electrode core 5a and the solid-state bonding layer 51 on the other face) after ultrasonic bonding is, for example, 80% or more of the thickness $T_nx$ of a layer of the negative-electrode core 5a in the non-bonding region 86 (see FIG. 5A) (substantially the same as the thickness of a layer of the negative-electrode core 5a before ultrasonic bonding), this can further effectively prevent the negative-electrode core 5a from being damaged or broken.

The width of the second region 81b of the negative-electrode core laminate may decrease with the distance from the negative-electrode current collector 8. This allows the second region 81b of the negative-electrode core laminate to compensate for the elongation of a metal constituting the first region 81a of the negative-electrode core laminate during ultrasonic bonding. This can further effectively prevent the negative-electrode core 5a from being damaged or broken. For example, the second region 81b may include a protrusion between adjacent core recesses 81x in the bonding region 81.

In the second region 81b, the bonding strength between layers of the negative-electrode core 5a may decrease with the distance from the negative-electrode current collector 8. This can further effectively prevent the negative-electrode core 5a from being damaged or broken. For example, in the second region 81b, a space may be formed between layers of the negative-electrode core 5a near the top of the layered negative-electrode core 5a in the lamination direction.

As described above, in the present embodiment, solid-state bonding between layers of the negative-electrode core 5a in the bonding region 81 of the negative-electrode core laminate bonded to the negative-electrode current collector 8 by ultrasonic bonding can ensure bonding strength and decrease bonding resistance, and the central layer 52 within the negative-electrode core 5a in which transformation of crystal grains is suppressed can ensure the continuity of the crystal grain state between the bonding region 81 and the non-bonding region 86 and can reduce the occurrence of cracking due to a lattice defect between the regions.

Figure 8A:
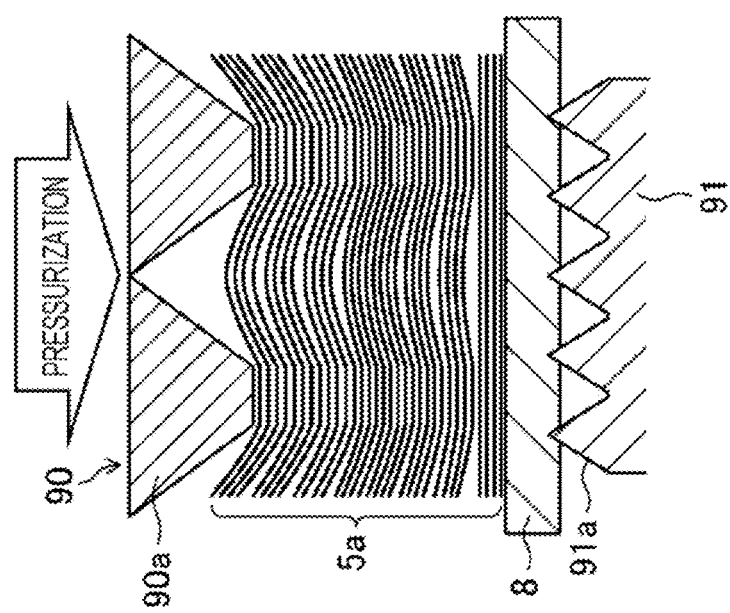
FIG. 8A is a schematic view of ultrasonic bonding between a negative-electrode core laminate and a negative-electrode current collector in the production of a secondary battery according to an embodiment when a horn is in contact with the negative-electrode core laminate.
Figure 8B:
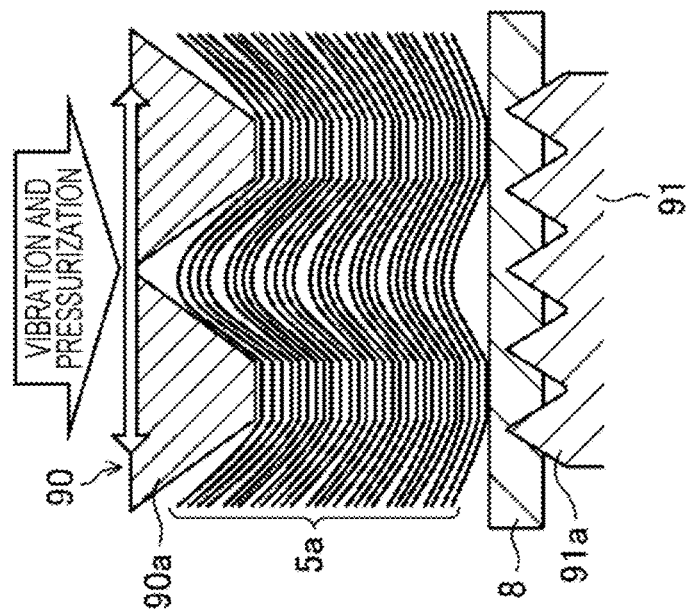
FIG. 8B is a schematic view of ultrasonic bonding between the negative-electrode core laminate and the negative-electrode current collector when the negative-electrode core laminate is being bonded to the negative-electrode current collector.

FIG. 8A is a schematic view of ultrasonic bonding between the negative-electrode core laminate and the negative-electrode current collector 8 according to the present embodiment when the horn 90 is in contact with the negative-electrode core laminate, and FIG. 8B is a schematic view of ultrasonic bonding between the negative-electrode core laminate and the negative-electrode current collector 8 when the negative-electrode core laminate is being bonded to the negative-electrode current collector 8.

As illustrated in FIG. 8A, in the present embodiment, when the horn 90 is in contact with the negative-electrode core laminate (the layered negative-electrode core 5a), the horn 90 is not vibrated, and the layered negative-electrode core 5a is only pressed such that the layered negative-electrode core 5a can maintain its interface structure. Subsequently, as illustrated in FIG. 8B, the horn 90 is vibrated in the direction parallel to the surface of the negative-electrode core 5a. This removes surface oxides from each surface of the negative-electrode core 5a and the negative-electrode current collector 8 by friction while the crystal grain state of each interior of the negative-electrode core 5a and the negative-electrode current collector 8 is maintained. This exposes the crystal lattice {111} plane on each surface of the negative-electrode core 5a and the negative-electrode current collector 8, and the {111} planes are bonded together at the contact interface between layers of the negative-electrode core 5a and at the contact interface between the negative-electrode core 5a and the negative-electrode current collector 8, thereby forming fine crystal grains and forming strong and stable bonding surfaces in the solid-state bonding state. Meanwhile, the crystal grain state before ultrasonic bonding is maintained in the negative-electrode core 5a and the negative-electrode current collector 8, and this can ensure the continuity of the crystal grain state between the bonding region 81 and the non-bonding region 86 and reduce the occurrence of cracking due to a lattice defect between the regions.

Figure 9A:
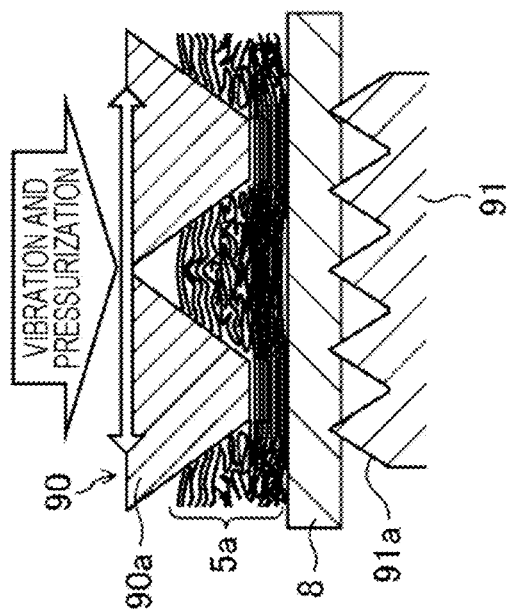
FIG. 9A is a schematic view of ultrasonic bonding between a negative-electrode core laminate and a negative-electrode current collector in the production of a secondary battery according to a comparative example when a horn is in contact with the negative-electrode core laminate.
Figure 9B:
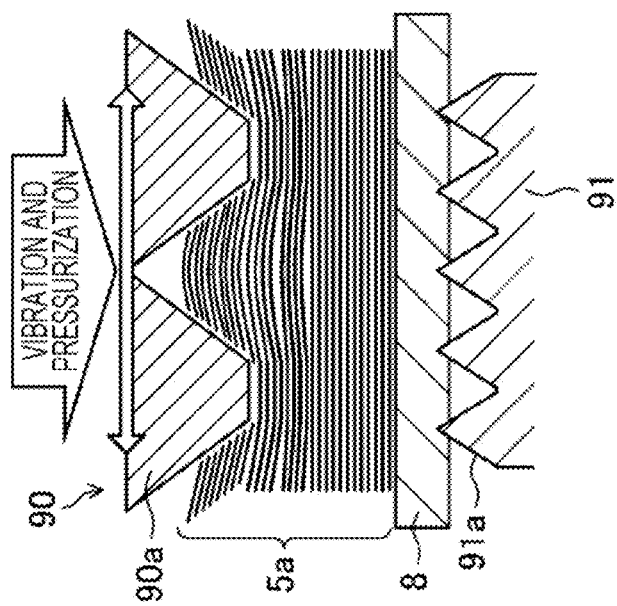
FIG. 9B is a schematic view of ultrasonic bonding between the negative-electrode core laminate and the negative-electrode current collector in the production of the secondary battery according to the comparative example when the negative-electrode core laminate is bonded to the negative-electrode current collector.

FIG. 9A is a schematic view of ultrasonic bonding between the negative-electrode core laminate and the negative-electrode current collector 8 according to the comparative example when the horn 90 is in contact with the negative-electrode core laminate, and FIG. 9B is a schematic view of ultrasonic bonding between the negative-electrode core laminate and the negative-electrode current collector 8 when the negative-electrode core laminate is being bonded to the negative-electrode current collector 8.

As illustrated in FIG. 9A, in the comparative example, pressure and vibration are applied to the negative-electrode core laminate (the layered negative-electrode core 5a) when the horn 90 is in contact with the negative-electrode core laminate. Thus, in the portion of the negative-electrode core laminate in which the horn 90 is engaged, the negative-electrode core 5a is damaged or broken. Subsequently, as illustrated in FIG. 9B, while the negative-electrode core laminate is pressed and vibrated, the negative-electrode core laminate is bonded to the negative-electrode current collector 8. The damage or breakage of the negative-electrode core 5a spreads over the entire bonding region 81, and ultrasonic vibration breaks crystal grains. Consequently, after the negative-electrode core laminate is bonded to the negative-electrode current collector 8, the crystal grain state before bonding is not observed, or alternate lamination of central layers and solid-state bonding layers of the negative-electrode core 5a is not observed, and fine crystal grains are distributed over the entire bonding region 81. Thus, the crystal grain state of the bonding region 81 is significantly different from the crystal grain state of the non-bonding region 86, and therefore cracking due to a lattice defect tends to occur between the bonding region 81 and the non-bonding region 86.

Figure 10A:
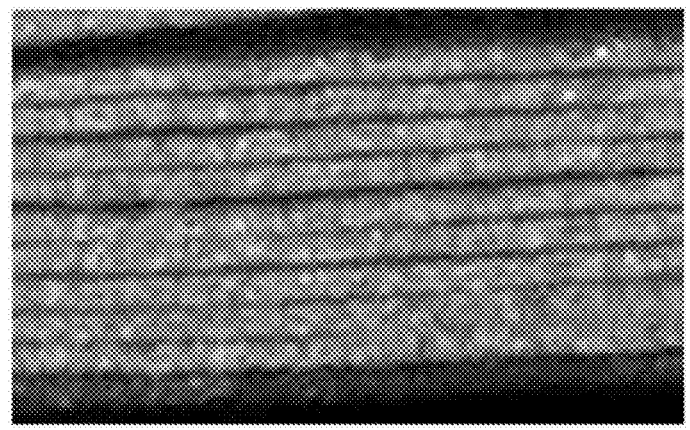
FIG. 10A is a photograph of a cross section of a negative-electrode core laminate before bonding to a negative-electrode current collector in the production of a secondary battery according to an embodiment.
Figure 10B:
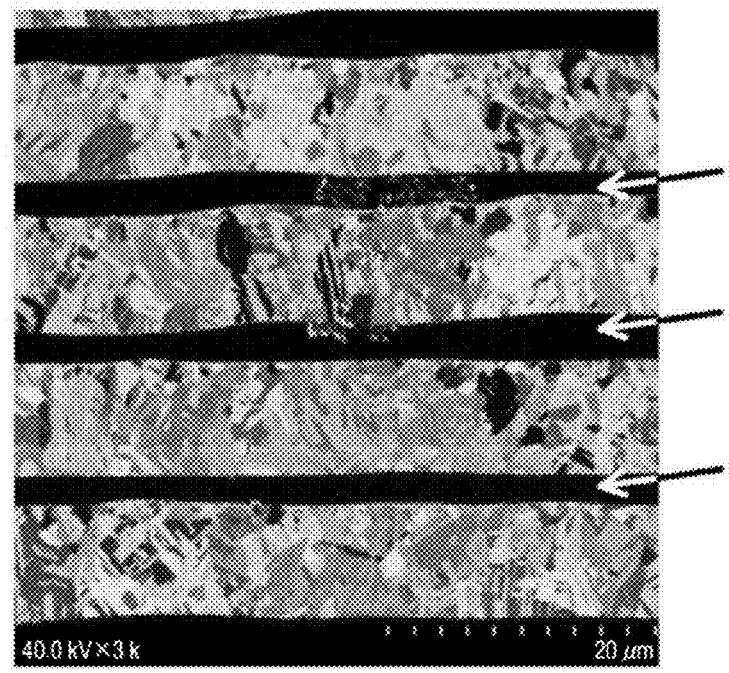
FIG. 10B is a SEM photograph of the cross section.

FIG. 10A is a photograph of a cross section of the negative-electrode core laminate before bonding to the negative-electrode current collector 8 according to the present embodiment, and FIG. 10B is a SEM photograph of the cross section. FIGS. 10A and 10B show that interfaces between layers of the negative-electrode core 5a, that is, copper core can be observed before bonding (arrows in FIG. 10B).

Figure 11A:
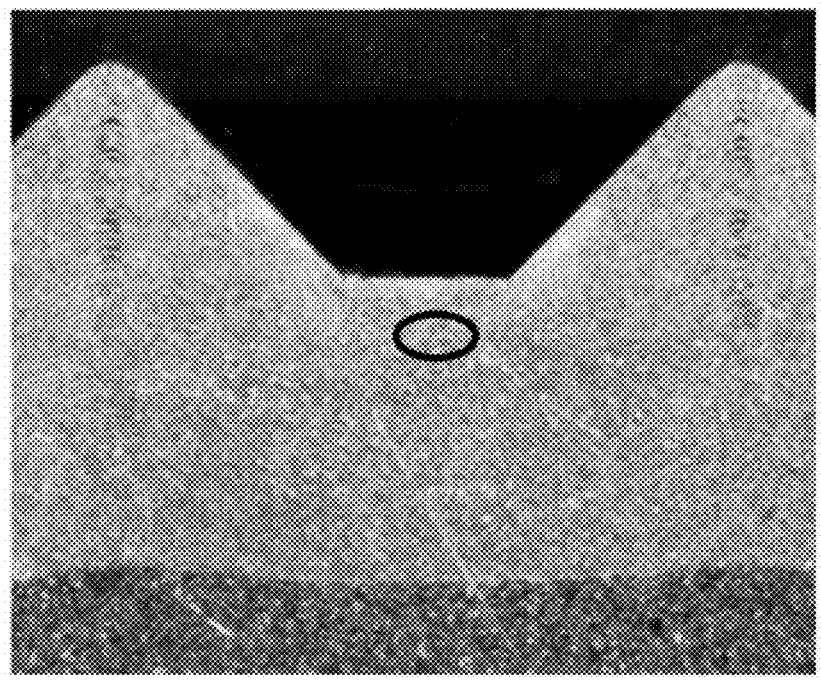
FIG. 11A is a photograph of a cross section of a negative-electrode core laminate after bonding to a negative-electrode current collector in the production of a secondary battery according to an embodiment.
Figure 11B:
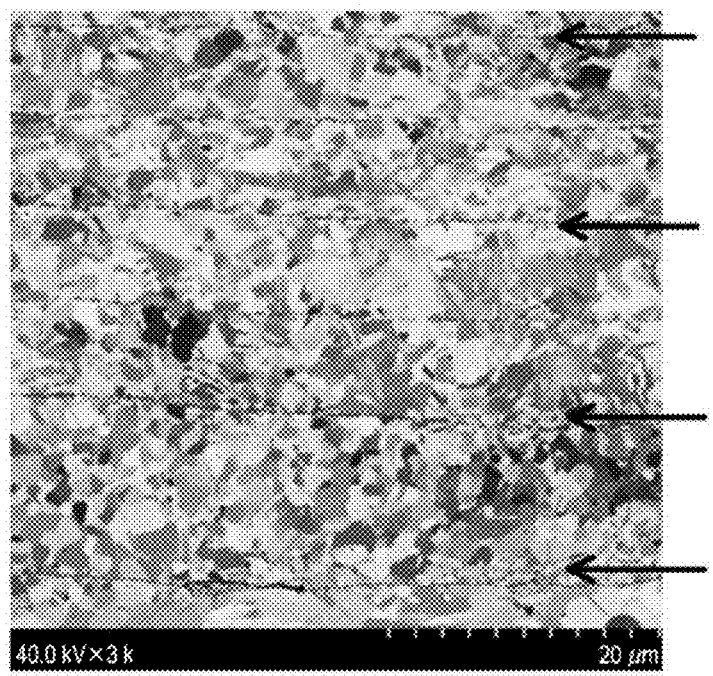
FIG. 11B is a SEM photograph of the cross section.

FIG. 11A is a photograph of a cross section of the negative-electrode core laminate after bonding to the negative-electrode current collector 8 according to the present embodiment, and FIG. 11B is a SEM photograph of the cross section. FIG. 11B is an enlarged view of the circular area of FIG. 11A. FIG. 11A shows that in the present embodiment the negative-electrode core 5a is layered without damage or breakage after bonding. FIG. 11B shows that, after bonding, the solid-state bonding layers (indicated by the arrows) formed by solid-state bonding between layers of copper core can be observed, the central layers the state of which before ultrasonic bonding is almost unchanged can also be observed, and furthermore alternately laminated solid-state bonding layers and central layers can be observed. As compared with the SEM photograph of FIG. 10B, fine crystal grains are distributed on the copper core surface, that is, in the solid-state bonding layers, and the crystal grain state before bonding is almost maintained within the copper core, that is, in the central layers.

Figure 12A:
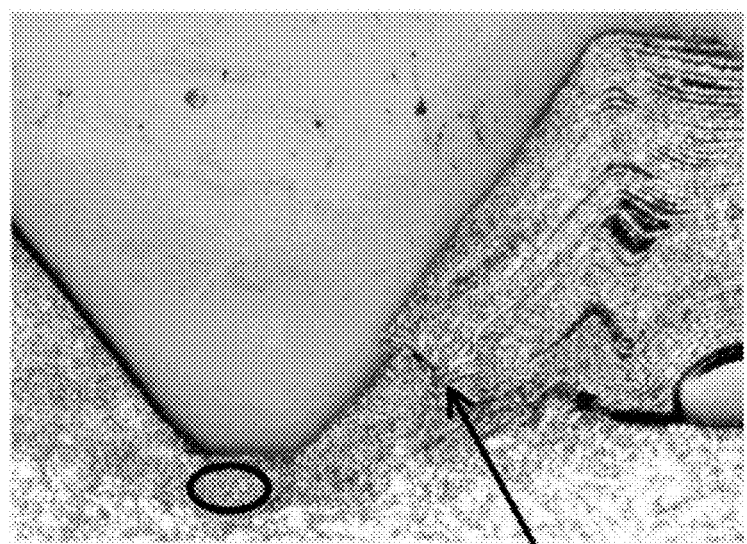
FIG. 12A is a photograph of a cross section of a negative-electrode core laminate after bonding to a negative-electrode current collector in the production of a secondary battery according to a comparative example.
Figure 12B:
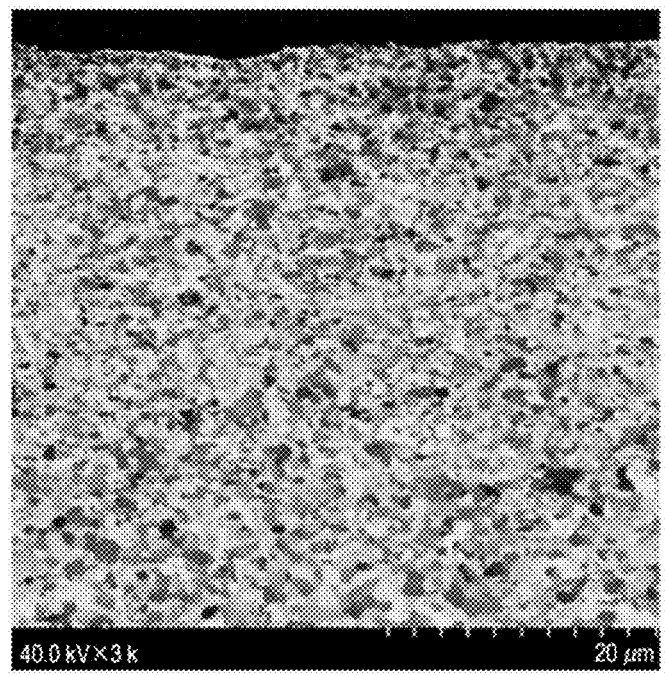
FIG. 12B is a SEM photograph of the cross section.

FIG. 12A is a photograph of a cross section of the negative-electrode core laminate after bonding to the negative-electrode current collector 8 according to the comparative example, and FIG. 12B is a SEM photograph of the cross section. FIG. 12B is an enlarged view of the circular area of FIG. 12A. FIG. 12A shows that in the comparative example finer crystal grains are formed in a recessed portion of the negative-electrode core 5a formed by ultrasonic bonding in the negative-electrode core laminate, and a discontinuous crystal grain state responsible for cracking is produced between the recessed portion and its exterior. FIG. 12B shows that, after bonding, alternately laminated solid-state bonding layers of the copper core and central layers are not observed. As compared with the SEM photograph of FIG. 10B, fine crystal grains are widely distributed, and a discontinuous crystal grain state responsible for cracking is produced.

Figure 13C:
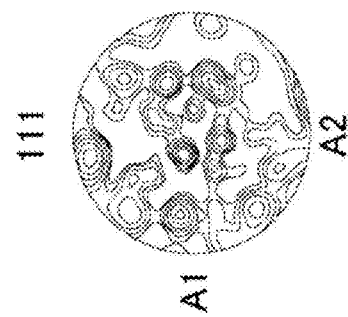
FIG. 13C is a pole figure of the {111} plane.
Figure 13B:
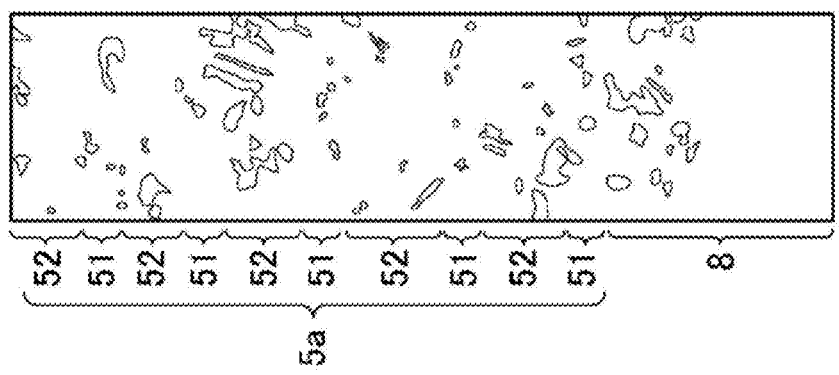
FIG. 13B is a direction map of a {111} plane.
Figure 13A:
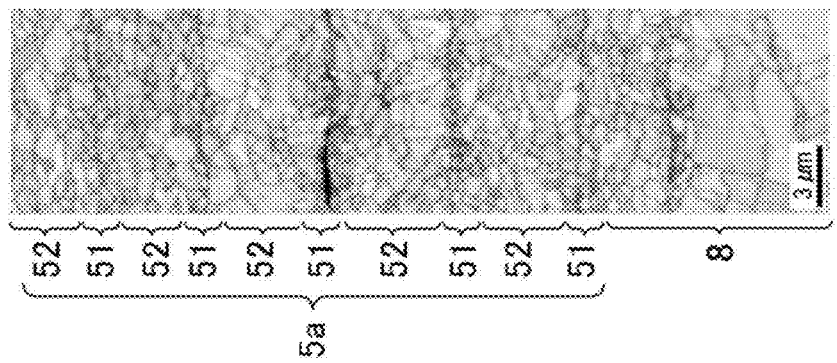
FIG. 13A is an image quality (IQ) map of the crystalline state of a negative-electrode core laminate of a secondary battery according to an embodiment.

FIG. 13A is an image quality (IQ) map of the crystalline state of the negative-electrode core laminate and the negative-electrode current collector 8 according to the present embodiment, FIG. 13B is a direction map of a {111} plane, and FIG. 13C is a pole figure of the {111} plane.

The IQ map of FIG. 13A shows that crystallinity is decreased near the solid-state bonding layer 51 formed between layers of the negative-electrode core 5a and near the solid-state bonding layer 51 formed between the negative-electrode core 5a and the negative-electrode current collector 8, indicating the presence of many fine crystal grains. The direction map of FIG. 13B shows the presence of the solid-state bonding layers formed by solid-state bonding between layers of the negative-electrode core 5a and the presence of the central layers the state of which before ultrasonic bonding is almost unchanged, indicating the presence of many {111} crystal faces on both sides of each solid-state bonding layer in the alternately laminated solid-state bonding layers and central layers. The pole figure of FIG. 13C shows a relatively symmetrical distribution and probably indicates that the {111} crystal face is parallel to the solid-state bonding layer.

Figure 14A:
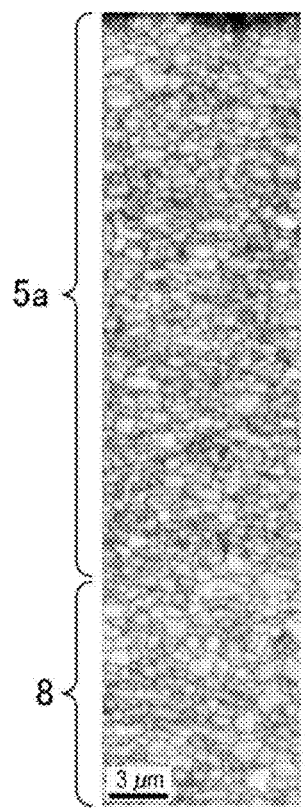
FIG. 14A is an IQ map of the crystalline state of a negative-electrode core laminate of a secondary battery according to a comparative example.
Figure 14B:
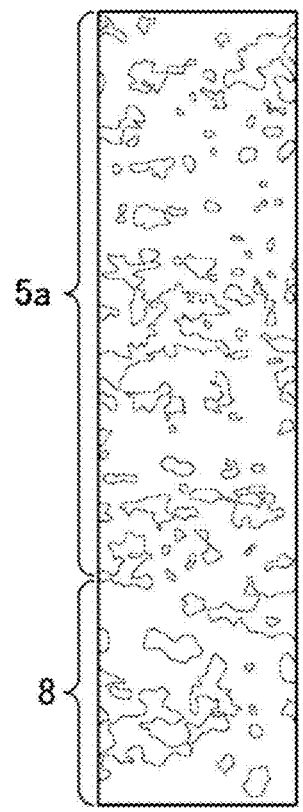
FIG. 14B is a direction map of a {111} plane.
Figure 14C:
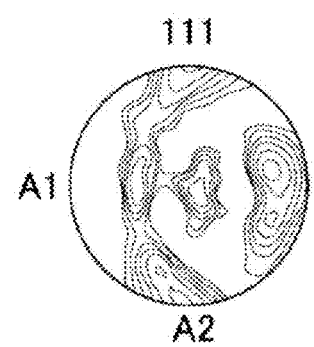
FIG. 14C is a pole figure of the {111} plane.

FIG. 14A is an image quality (IQ) map of the crystalline state of the negative-electrode core laminate and the negative-electrode current collector 8 according to the comparative example, FIG. 14B is a direction map of a {111} plane, and FIG. 14C is a pole figure of the {111} plane.

The IQ map of FIG. 14A shows no solid-state bonding layer of the negative-electrode core 5a or no solid-state bonding layer formed between the negative-electrode core 5a and the negative-electrode current collector 8 in the comparative example, indicating the wide presence of many fine crystal grains. The direction map of FIG. 14B shows the random distribution of the {111} crystal faces. The pole figure of FIG. 14C shows an asymmetrical distribution and indicates that the {111} crystal faces are randomly aligned.

As described above, the crystal grain state of the bonding layer formed between the negative-electrode core laminate and the negative-electrode current collector is clearly different between the present embodiments and the comparative example. The present embodiments, which ensure the continuity of the crystal grain state between the bonding region and the non-bonding region, can reduce the occurrence of cracking due to a lattice defect between the regions, whereas the comparative example, which has a discontinuous crystal grain state between the bonding region and the non-bonding region, tends to have a crack due to a lattice defect between the regions.

In the present embodiments, the ultrasonic bonding conditions for strong bonding can be reliably determined due to the clear target crystal grain state in bonding. By contrast, in the comparative example, without attention to the continuity of the crystal grain state between the bonding region and the non-bonding region, the ultrasonic bonding conditions for strong bonding are difficult to reliably determine due to various variation factors in bonding.

Examples 1 to 3

A negative-electrode core laminate composed of 62 layers of negative-electrode core 5a made of copper 8 μm in thickness was bonded to a negative-electrode current collector 8 made of copper 0.8 mm in thickness by ultrasonic bonding under different conditions.

In a first region 81a in a bonding region 81 of the layered negative-electrode core 5a (negative-electrode core laminate), in which core recesses 81x were formed, the thickness $T_n x$ of a layer of the negative-electrode core 5a in a non-bonding region 86 was adjusted to be 8 μm and the thickness $T_n y$ of a central layer 52 of the negative-electrode core 5a was adjusted to be 7.2 μm in Example 1, $T_n y$ was adjusted to be 6.8 μm in Example 2, and $T_n y$ was adjusted to be 6.4 μm in Example 3. An ultrasonic bonding apparatus with a frequency of 20 kHz was used in these examples.

Comparative Example 1

A negative-electrode core laminate composed of 62 layers of negative-electrode core 5a made of copper 8 μm in thickness was bonded to a negative-electrode current collector 8 made of copper 0.8 mm in thickness by ultrasonic bonding under the conditions described in Patent Document 1.

In a first region 81a in a bonding region 81 of the layered negative-electrode core 5a (negative-electrode core laminate), in which core recesses 81x were formed, alternately laminated solid-state bonding layers formed by solid-state bonding between layers of the negative-electrode core 5a and central layers the state of which before ultrasonic bonding was almost unchanged were not observed, and fine crystal grains were distributed throughout the negative-electrode core laminate. In Comparative Example 1, there was no central layer 52, and $T_n x = 15$ μm and $T_n y = 0$. The ultrasonic bonding apparatus with a frequency of 20 kHz was also used in Comparative Example 1.

Table 1 lists the ultrasonic bonding conditions, the cross-sectional state of the negative-electrode core laminate after bonding (the cross-sectional state of the first region 81a), the presence or absence of foil breakage at the boundary between the bonding region and the non-bonding region (that is, a crack in the negative-electrode core laminate), the electrical resistance of the bonded portion between the negative-electrode core laminate and the negative-electrode current collector 8 in Examples 1 to 3 and Comparative Example 1. In Table 1, $T_n x = 8$.

TABLE 1

|  | Horn load (N) | Horn amplitude (%) | Bonding time (ms) | Tny | Tny/Tnx | Foil breakage | Electrical resistance of bonded portion (mΩ) |
| --- | --- | --- | --- | --- | --- | --- | --- |
| Example 1 | 1800 | 75 | 600 | 7.2 | 0.9 | None | 0.003 |
| Example 2 | 1800 | 80 | 600 | 6.8 | 0.85 | None | 0.002 |
| Example 3 | 1800 | 85 | 600 | 6.4 | 0.8 | None | 0.002 |
| Comparative example 1 | 10000 | 85 | 600 | 0 | 0 | Yes | 0.004 |

Table 1 shows that ultrasonic bonding under the conditions of Examples 1 to 3 ensured the continuity of the crystal grain state between the bonding region and the non-bonding region, and no foil breakage, that is, no crack in negative-electrode core laminate was observed. The thickness $T_ny$ of the central layer 52 could be decreased to reduce the electrical resistance of the bonded portion. By contrast, in the comparative example, no central layer was formed, and the crystal grain state between the bonding region and the non-bonding region was discontinuous. Thus, foil breakage, that is, a crack in the negative-electrode core laminate was observed.

Although the embodiments (including the examples; the same applies hereinafter) of the present invention have been described, the present invention is not limited to these embodiments, and various modifications are possible within the scope of the present invention. These embodiments are only examples and are not intended to limit the present invention, applications thereof, or uses thereof.

For example, although a rectangular secondary battery including a flat wound electrode assembly was exemplified as a secondary battery in the present embodiments, the present invention may also be applied to another electrode assembly including a negative-electrode core laminate, for example, an electrode assembly including positive electrodes and negative electrodes alternately laminated with a separator interposed therebetween, wherein a negative-electrode core laminate composed of a negative-electrode current collector tab protruding from each negative electrode is bonded to a negative-electrode current collector by ultrasonic bonding. The type of secondary battery is also not particularly limited, and the present invention can be applied to various batteries containing different electrode assembly constituent materials or electrolytes as well as lithium secondary batteries. The present invention can also be applied to secondary batteries of various shapes (cylindrical etc.) as well as rectangular batteries. The shape of the electrode assembly, the electrode active materials of the positive electrode and the negative electrode, and the constituent materials of the electrolyte can also depend on the application.

In the present embodiment, the negative-electrode core is made of copper or a copper alloy, and the negative-electrode current collector is made of copper or a copper alloy. However, the positive-electrode core may be made of copper or a copper alloy, and the positive-electrode current collector may be made of copper or a copper alloy. A core made of copper or a copper alloy preferably has a thickness in the range of 5 to 30 μm, more preferably 6 to 15 μm, for example. The number of layers of copper or copper alloy core preferably ranges from 20 to 100, more preferably 40 to 80, for example.

A current collector made of copper or a copper alloy preferably has a thickness in the range of 0.5 to 2.0 mm, more preferably 0.8 to 1.5 mm, for example.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
an electrode assembly including a first electrode sheet and a second electrode sheet, the first electrode sheet and the second electrode sheet having different polarities; and
a first electrode current collector electrically connected to the first electrode sheet,
wherein the first electrode sheet includes a first electrode core and a first electrode active material layer on the first electrode core,
the first electrode core is made of copper or a copper alloy,
the first electrode current collector is made of copper or a copper alloy,
the electrode assembly includes a first electrode core laminate of the first electrode core,
the first electrode core laminate is bonded to the first electrode current collector by ultrasonic bonding,
a core recess is formed in a bonding region of the first electrode core laminate bonded to the first electrode current collector by ultrasonic bonding,
a region of the first electrode core laminate in which the core recess is formed includes a solid-state bonding layer and a central layer, the solid-state bonding layer being formed by solid-state bonding of an interface between layers of the first electrode core, the central layer being disposed between the solid-state bonding layers formed on both faces of the first electrode core, and
metal crystal grains constituting the solid-state bonding layer have a first average grain size smaller than a second average grain size of metal crystal grains constituting the central layer.

2. The secondary battery according to claim 1, wherein the first average grain size is 75% or less of the second average grain size.

3. The secondary battery according to claim 1, wherein the second average grain size is equal to or smaller than a third average grain size of metal crystal grains constituting the first electrode core outside the bonding region of the first electrode core laminate.

4. The secondary battery according to claim 3, wherein the second average grain size is 95% or less of the third average grain size.

5. The secondary battery according to claim 1, wherein a thickness of the central layer is 80% or more and 90% or less of a thickness of the first electrode core outside the bonding region of the first electrode core laminate.

6. The secondary battery according to claim 1, wherein layers of the first electrode core laminated in the bonding region of the first electrode core laminate are bonded together while a {111} plane of a crystal structure formed by alignment of metal crystal grains constituting each layer of the first electrode core faces each other.

7. The secondary battery according to claim 1, wherein
the first electrode sheet is long,
the second electrode sheet is long,
the electrode assembly is a flat wound electrode assembly formed by winding the first electrode sheet and the second electrode sheet with a long separator interposed therebetween, and
the first electrode core laminate formed of an exposed portion of the first electrode core wound is disposed at one end of the wound electrode assembly.

* * * * *